(12) United States Patent
Hermann

(10) Patent No.: US 8,890,057 B2
(45) Date of Patent: Nov. 18, 2014

(54) OPTICAL POSITION-MEASURING DEVICE

(75) Inventor: Michael Hermann, Tacherting (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 203 days.

(21) Appl. No.: 13/472,274

(22) Filed: May 15, 2012

(65) Prior Publication Data
US 2012/0292493 A1  Nov. 22, 2012

(30) Foreign Application Priority Data

May 18, 2011  (DE) .......................... 10 2011 076 055

(51) Int. Cl.
*G01D 5/38* (2006.01)
*G01D 5/36* (2006.01)

(52) U.S. Cl.
CPC . *G01D 5/366* (2013.01); *G01D 5/38* (2013.01)
USPC .............. 250/237 G; 250/231.13; 250/231.16

(58) Field of Classification Search
USPC ....................................... 250/231.13–231.18
See application file for complete search history.

(56) References Cited

U.S. PATENT DOCUMENTS

| | | | |
|---|---|---|---|
| 5,977,539 A * | 11/1999 | Holzapfel et al. | 250/237 G |
| 6,541,761 B1 * | 4/2003 | Holzapfel et al. | 250/231.14 |
| 7,858,922 B2 * | 12/2010 | Holzapfel et al. | 250/231.13 |
| 7,907,286 B2 * | 3/2011 | Holzapfel | 356/499 |
| 2008/0117440 A1 | 5/2008 | Saendig | |
| 2011/0188055 A1 | 8/2011 | Hermann | |

FOREIGN PATENT DOCUMENTS

| | | |
|---|---|---|
| DE | 197 48 802 | 5/1998 |
| DE | 199 36 181 | 5/2000 |
| DE | 10 2008 044 858 | 3/2010 |
| JP | 2002-048602 | 2/2002 |

OTHER PUBLICATIONS

European Search Report, dated Sep. 5, 2014, issued in corresponding European Patent Application No. 12166338.9.

* cited by examiner

*Primary Examiner* — Tony Ko
(74) *Attorney, Agent, or Firm* — Kenyon & Kenyon LLP

(57) ABSTRACT

An optical position-measuring device includes a measuring standard and a scanning unit. The measuring standard includes an incremental graduation and at least one reference marking at a reference position. The reference marking has two reference-marking subfields disposed in mirror symmetry relative to a reference-marking axis of symmetry, each of the subfields including a grating structure having a locally changeable graduation period. The scanning unit includes a divergently emitting light source, one or more gratings, and a reference-signal detector system. The reference-signal detector system has at least four detector arrays formed and positioned such that, from the scanning of the reference marking via the reference-signal detector system, first and second pairs of partial reference signals result, in each case having a signal pattern in phase opposition. The first pair of partial reference signals is offset by an offset amount relative to the second pair of partial reference signals.

17 Claims, 10 Drawing Sheets

OPTICAL POSITION-MEASURING DEVICE

CROSS-REFERENCE TO RELATED APPLICATIONS

The present application claims priority to Application No. 10 2011 076 055.5, filed in the Federal Republic of Germany on May 18, 2011, which is expressly incorporated herein in its entirety by reference thereto.

FIELD OF THE INVENTION

The present invention relates to an optical position-measuring device.

BACKGROUND INFORMATION

German Published Patent Application No. 10 2008 044 858 describes an optical position-measuring device that is suitable for detecting the position of two objects movable relative to each other in at least one measuring direction. To that end, the position-measuring device includes a measuring standard which is joined to one of the two objects. The measuring standard has an incremental graduation extending in the measuring direction, as well as at least one reference marking at a reference position. The reference marking provides a reference point for the high-resolution, incremental position measurement, to which the incremental measurement is related after the reference marking has been crossed and a reference signal has been generated. Moreover, the position-measuring device includes a scanning unit which is joined to the other of the two objects and which has a divergently emitting light source, one or more gratings, as well as a reference-signal detector system. German Published Patent Application No. 10 2008 044 858 describes in detail how, in an optical position-measuring device based on a scanning principle using divergent lighting, what are termed chirped reference markings are able to be utilized to generate a high-resolution reference signal.

In this position-measuring device, the reference marking is located in a separate reference track adjacent to an incremental track having the incremental graduation on the measuring standard. For this reason, the position of the reference signal relative to the incremental signals is a function of the angle of twist between the measuring standard and the scanning unit about an axis which is oriented perpendicularly to the plane of the measuring standard. In this context, the smaller the graduation period of the incremental graduation and the greater the distance of the scanning centroids for the incremental track and reference-mark track perpendicular to the measuring direction, the greater the sensitivity with respect to such a twisting. However, the defined position and width of the generated reference signal relative to the incremental signals are of great importance for the correct further processing of the reference signal.

The position of the reference signal is usually set by a troublesome mechanical adjustment of the scanning unit. The width of the reference signal may be effected by the selective change of comparator trigger thresholds which the respective analog current pulse or voltage pulse must exceed or drop below during the signal processing in order to generate the rising edge or the cut-off edge of the reference signal. However, especially when working with high-resolution optical position-measuring devices, the expenditure for such a mechanical and electrical adjustment is considerable.

SUMMARY

Example embodiments of the present invention provide an optical position-measuring device which is based on a scanning principle using divergent lighting, and provide for simple generation of a reference signal having a defined position and width relative to the incremental signals.

According to example embodiments of the present invention, an optical position-measuring device for detecting the position of two objects movable relative to each other in at least one measuring direction includes, first of all, a measuring standard which is joined to one of the two objects, and which has an incremental graduation extending in the measuring direction, as well as at least one reference marking at a reference position. The reference marking includes two reference-marking subfields disposed in mirror symmetry relative to a reference-marking axis of symmetry, each of the subfields including a grating structure extending in the measuring direction and having a locally changeable graduation period. The optical position-measuring device further includes a scanning unit which is joined to the other of the two objects and which has a divergently emitting light source, one or more gratings, as well as a reference-signal detector system. The reference-signal detector system has at least four detector arrays, each having a plurality of detector elements. The detector arrays are formed and positioned such that, from the scanning of the reference marking via the reference-signal detector system, a first and second pair of partial reference signals result, in each case having a signal pattern in phase opposition, and the first pair of partial reference signals is offset by an offset amount along the measuring direction relative to the second pair of partial reference signals.

The detector elements of the first and second detector array may be configured such that, starting from a first detector axis of symmetry, in the measuring direction, the center-to-center distances between adjacent detector elements in the same direction change in the manner of the graduation periods of the grating structures in the reference-marking subfields, starting from the reference-marking axis of symmetry. The detector elements of the third and fourth detector array are configured such that, starting from a second detector axis of symmetry, in the measuring direction, the center-to-center distances between adjacent detector elements in the same direction change in the manner of the graduation periods of the grating structures in the reference-marking subfields, starting from the reference-marking axis of symmetry.

In this context, the second detector axis of symmetry may be offset relative to the first detector axis of symmetry by an amount which corresponds to double the offset amount between the first and second pair of partial reference signals.

It is also possible to provide a device for generating an adjustment signal which results from the optical scanning of the reference marking on the measuring standard, the adjustment signal being used to set one or more trigger signals in the context of the further processing of the partial reference signals to form one reference signal.

For example, steady (unchopped)-radiation detector elements may be disposed between the detector elements of the detector arrays for generating the adjustment signal.

It is also possible to provide a summation element for generating the adjustment signal, the summation element being used to sum up all partial reference signals of the detector arrays.

It may be provided that the first and second pair of partial reference signals are applied to the inputs of two differential amplifiers, and at the outputs of the two differential amplifiers, in each case, a pulse-shaped signal is ready for further processing; downstream of the two differential amplifiers are a summation element and a subtraction element, via which a composite signal and a differential signal result from the pulse-shaped signals; the composite signal and differential signal are applied to the first inputs of a plurality of comparators, to whose respective second inputs, a trigger signal derived from the adjustment signal is applied; and downstream of the plurality of comparators is a logic element, at whose output, the reference signal results.

The adjustment signal may be amplified via an input amplifier, and the amplified adjustment signal may be supplied to three amplifiers having different adjustable amplification factors, and the three differently amplified signals derived from the adjustment signal may be supplied as trigger signals to the second inputs of the three comparators.

Moreover, the adjustment signal resulting from the summing-up process is able to be supplied to three amplifiers having different adjustable amplification factors, and the three differently amplified signals derived from the adjustment signal are able to be supplied as trigger signals to the second inputs of the three comparators.

It is also possible to provide a diaphragm having a transmitting slit between the light source and the measuring standard.

Moreover, on a portion of the detector elements, cover gratings may be placed whose grating lines are oriented orthogonally relative to the longitudinal-extension direction of the detector elements.

Grating structures may be arranged in the measuring direction on both sides adjacent to the reference marking in a reference track on the measuring standard, the grating structures exerting an optically diffusing effect on the beams of rays falling on them.

In this context, the grating structures in the reference track may have a graduation period which corresponds to half the graduation period of the incremental graduation located in an incremental track on the measuring standard.

The grating structures in the reference track may have a line/graduation-period ratio of, e.g., 0.25.

The detector system may include four detector arrays. A first and a second detector array are formed in mirror symmetry relative to a first detector axis of symmetry that extends in the detection plane perpendicular to the measuring direction, the first and the second detector array being disposed offset relative to each other in the detection plane perpendicular to the measuring direction. A third and a fourth detector array are formed in mirror symmetry relative to a second detector axis of symmetry that extends in the detection plane perpendicular to the measuring direction and is offset in the measuring direction relative to the first detector axis of symmetry, the third and fourth detector arrays being disposed offset relative to each other in the detection plane perpendicular to the measuring direction.

Alternatively, a first and a second detector array are formed in mirror symmetry relative to a first detector axis of symmetry that extends in the detection plane perpendicular to the measuring direction, the first and the second detector array being disposed adjacent to each other in the measuring direction; a third and a fourth detector array are formed in mirror symmetry relative to a second detector axis of symmetry that extends in the detection plane perpendicular to the measuring direction and is offset in the measuring direction relative to the first detector axis of symmetry, the third and fourth detector arrays being disposed adjacent to each other in the measuring direction; and the first and second detector arrays are offset in the extension direction of the detector axes of symmetry relative to the third and fourth detector arrays.

By the measures described herein, an optical position-measuring device is provided which is based on a scanning principle using divergent lighting, and permits an electronic adjustment of the reference signal generated. The position of the reference signal in relation to the incremental signals, as well as its width, may be set electronically, without a complicated mechanical adjustment.

In particular, by generating the two pairs of partial reference signals having, in each instance, a signal pattern in phase opposition, a signal processing results which is very insensitive with respect to external disturbances.

The comparator trigger thresholds necessary for the defined setting of the position and width of the reference signal are derived from an adjustment signal which results from the optical scanning of the reference marking. In this manner, the stability of the reference-signal generation is increased with respect to changes in signal amplitude as may occur, for example, due to soiling, aging of the light source or temperature changes.

The optical position-measuring device may take the form both of a linear encoder for detecting linear shifting movements, as well as a rotary position-measuring instrument for detecting rotational motions about an axis of rotation.

In addition, it is possible to implement both transmitted-light variants and incident-light variants of the optical position-measuring device.

Further features and aspects of example embodiments of the present invention are described in more detail below with reference to the appended Figures.

BRIEF DESCRIPTION OF THE DRAWINGS

FIG. 3b illustrates an enlarged section of the detection plane illustrated in FIG. 3a.

FIG. 8 illustrates an optical adjustment signal generated via the reference-signal detector system illustrated in FIG. 3a.

FIG. 9 shows a circuit configuration for processing the partial reference signals from the reference-signal detector system illustrated in FIG. 3a.

FIG. 10 illustrates a variant of the reference-signal detector system illustrated in FIG. 3a;

DETAILED DESCRIPTION

Figure 1:
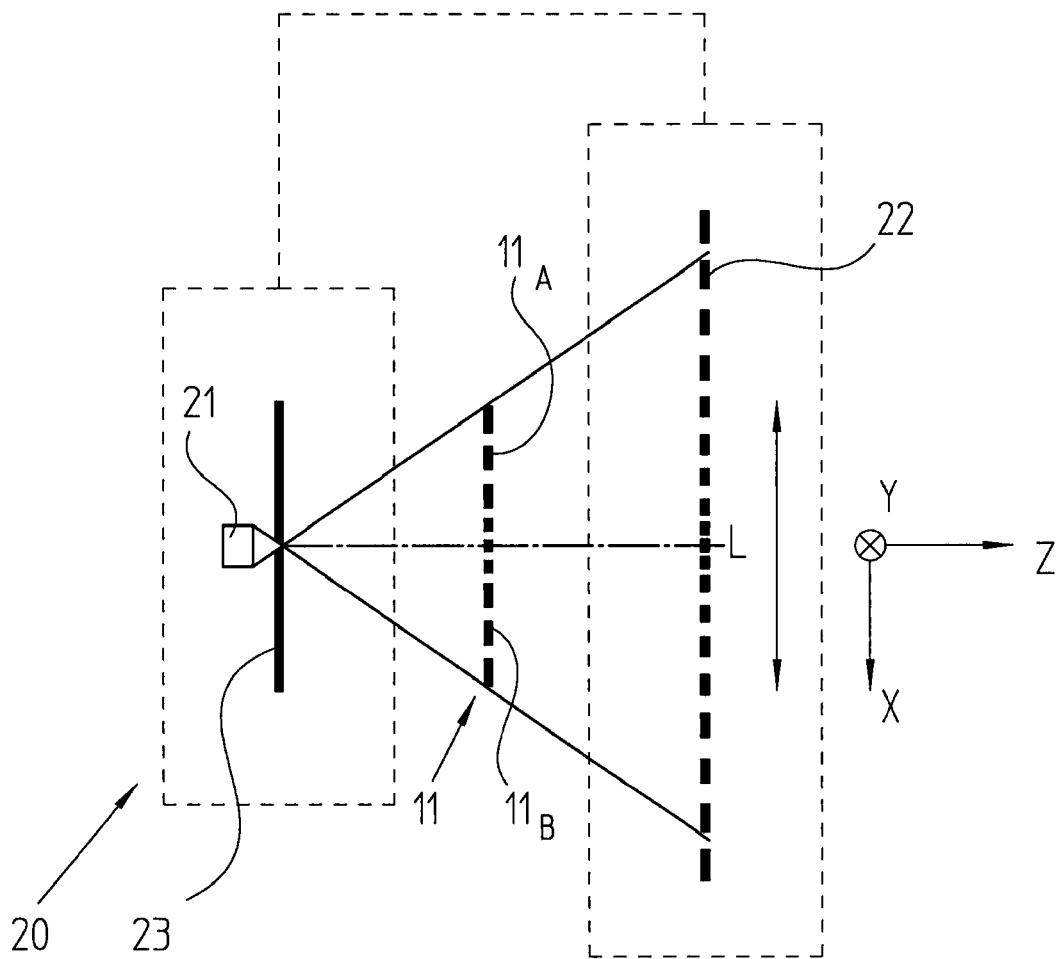
FIG. 1 schematically illustrates a scanning beam path for generating a reference signal in an a position-measuring device according to an example embodiment of the present invention.
Figure 2:
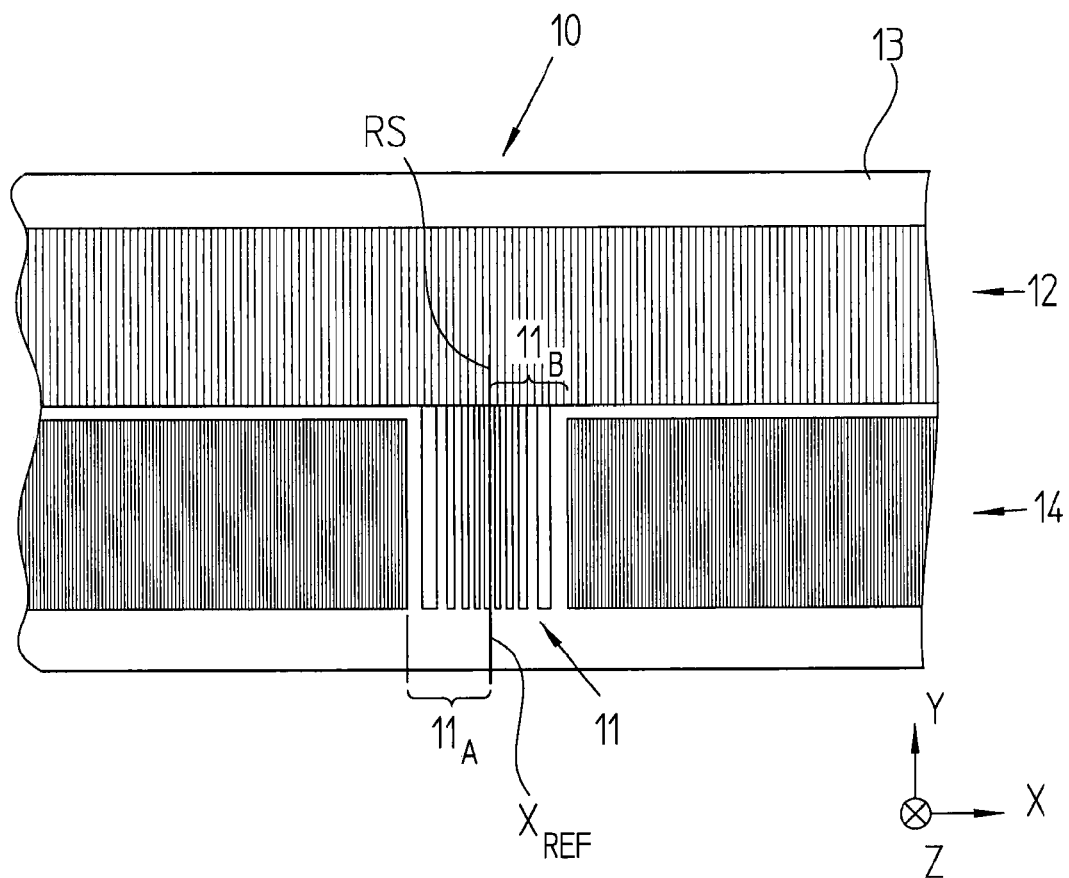
FIG. 2 is a top view of the measuring standard of the optical position-measuring device illustrated in FIG. 1, having an incremental graduation and a reference marking.
Figure 3A:
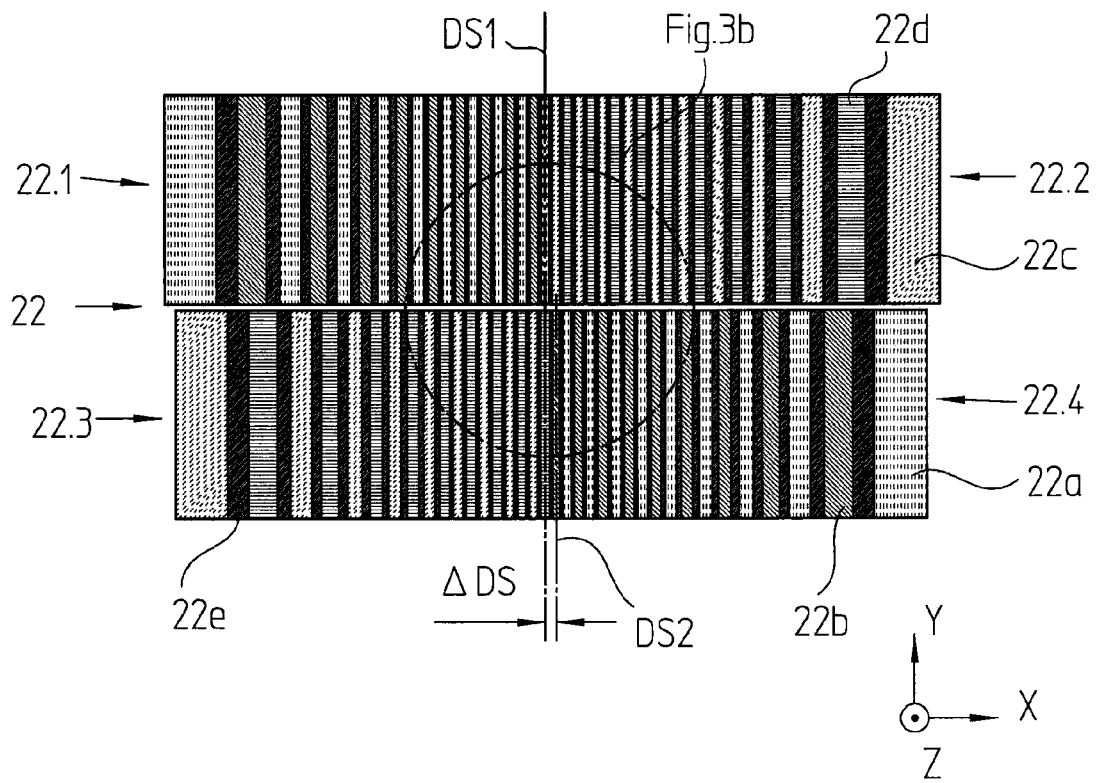
FIG. 3a is a schematic partial view of the detection plane of the optical position-measuring device, having a first exemplary embodiment of a suitable reference-signal detector system.
Figure 3B:
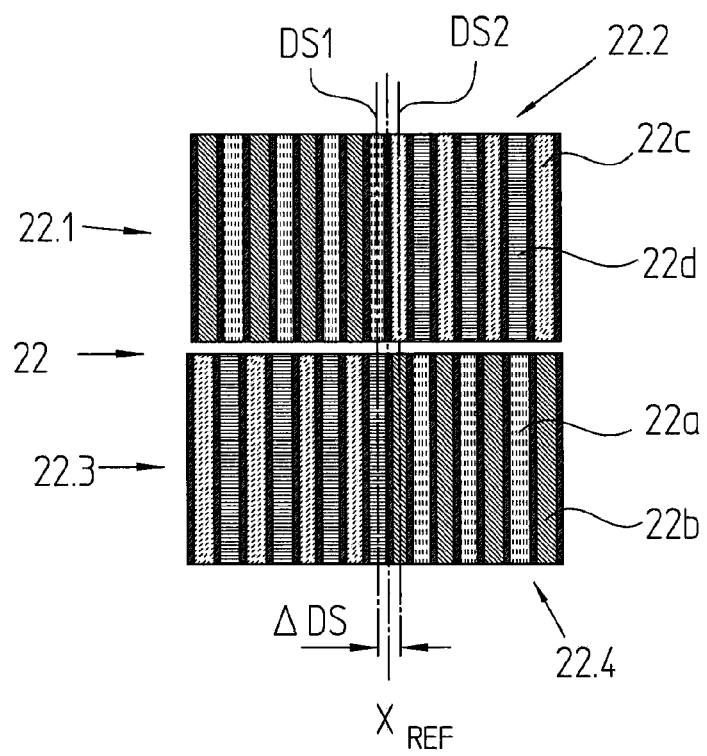
Figure 8:
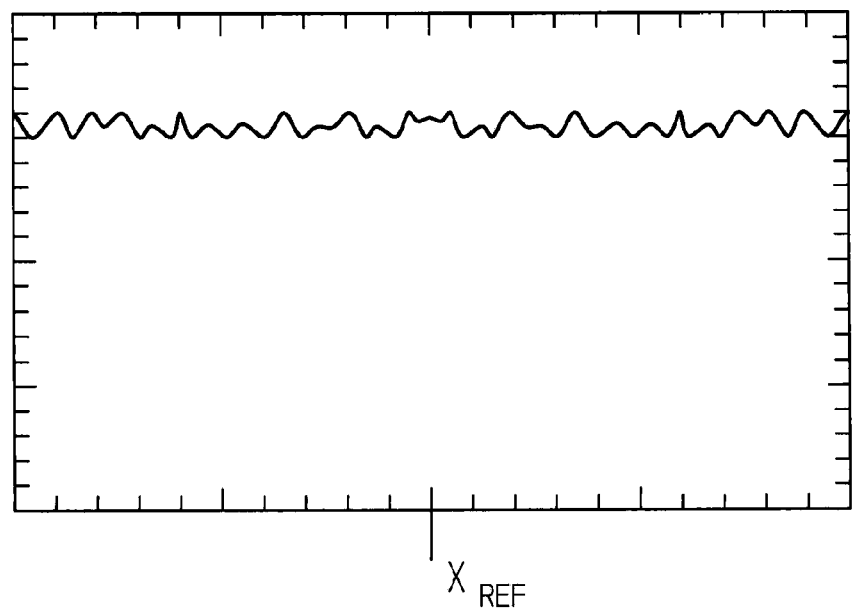
Figure 9:
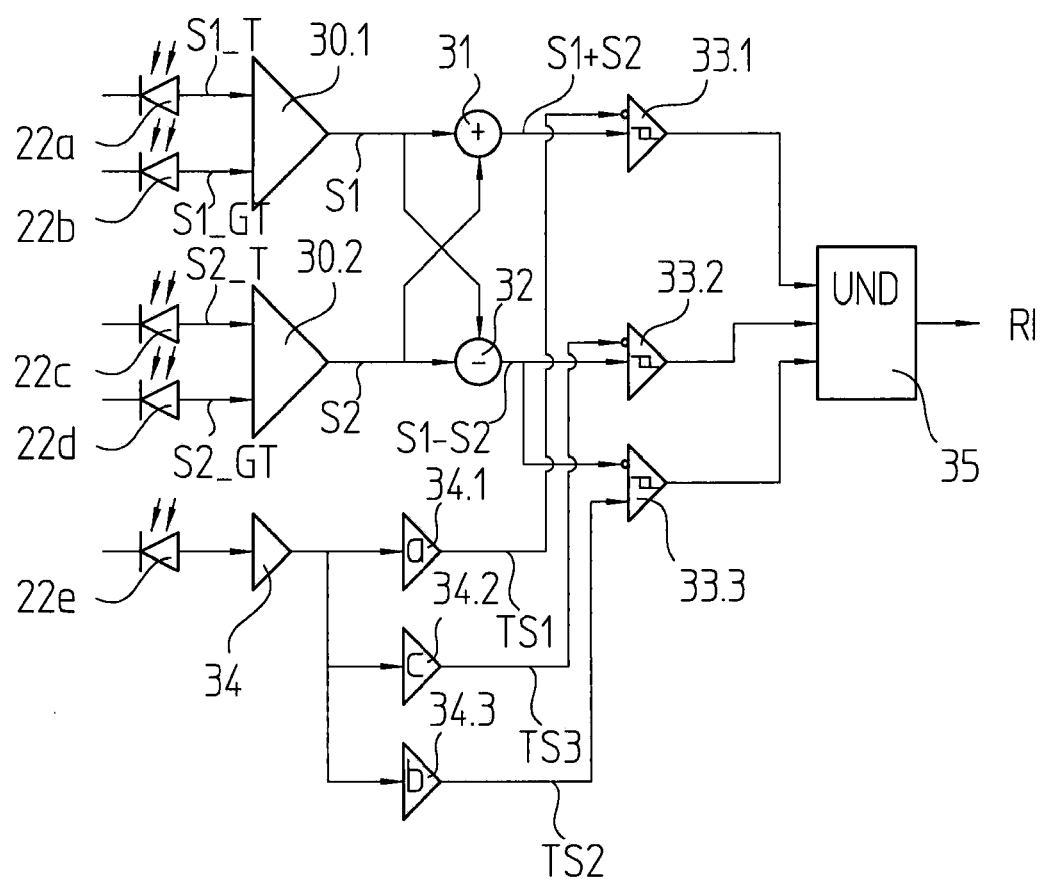

In the following, an optical position-measuring device according to an example embodiment of the present invention is described in detail with reference to FIGS. 1 to 9. FIG. 1 shows the scanning beam path for generating the reference pulse signal, in schematic form. FIG. 2 is a top view of the measuring standard in the area of the reference marking. FIG. 3a shows a partial view of the detection plane, and FIG. 3b shows an enlarged section from FIG. 3a. FIGS. 4a to 8 show various signal patterns for clarifying the signal processing, and FIG. 9 shows a suitable circuit configuration for generating the reference signal.

In the exemplary embodiment illustrated, the optical position-measuring device takes the form of a transmitted-light linear encoder and includes a scanning unit 20 which is arranged so as to be movable relative to measuring standard 10 in measuring direction x. Measuring standard 10 and scanning unit 20 are joined, for example, to two objects arranged in a manner allowing movement relative to each other in measuring direction x. For example, they may be two machine parts movable relative to each other. A downstream control unit is able to suitably control the movement of these machine parts in, e.g., conventional manner based on the generated, position-dependent output signals (incremental signals, reference-pulse signal) of the optical position-measuring device.

The representation in FIG. 1 is highly schematic, in particular, the measuring-standard wraparound of scanning unit 20, necessary for the transmitted-light system, is indicated merely in principle by the dotted-line connection of the parts of scanning unit 20 on the light-source side and the parts of scanning unit 20 on the detection side. Likewise, only scanned reference marking 11 is indicated schematically on the side of the measuring standard in FIG. 1.

In the present example, measuring standard 10 includes a linear incremental graduation 12 that extends in measuring direction x and is located on a graduated-scale support 13. Incremental graduation 12 includes partial areas disposed periodically with graduation period of, e.g., $TP_{INC}$=8 μm in measuring direction x and having different optical properties, that extend in the graduation plane in the y-direction. In the example shown, incremental graduation 12 is in the form of a transmitted-light phase grating having a phase deviation of 180° and a division ratio of 1:1.

Adjacent to the track having incremental graduation 12, on the side of measuring standard 10, a reference track is provided, in which a reference marking 11 is located at a defined reference position $X_{REF}$ on graduated-scale support 13. In principle corresponding reference markings may also be placed at a plurality of reference positions. Like incremental graduation 12, reference marking 11 is likewise in the form of a phase grating having a phase deviation of 180°, and includes structures having alternating partial areas 11.1, 11.2 which produce different phase-shifting effects on the incident beams of rays.

Moreover, in the reference track, in each case periodic grating structures 14 are disposed in measuring direction x on both sides adjacent to reference marking 11. In the exemplary embodiment shown, grating structures 14 extend over the entire length of the reference track, and thus are located everywhere in the reference track where no reference marking 11 is provided. Additional grating structures 14 in the reference track have a graduation period $TP_G$ which deviates from graduation period $TP_{INC}$ of incremental graduation 12. For example, graduation period $TP_G$ of grating structures 14 is selected to be equal to half the graduation period of incremental graduation $TP_{INC}$. The line/graduation-period ratio for grating structures 14 has the value 0.25. Grating structures 14 are formed such that several orders of diffraction (0th, +/−1st, +/−2nd) having similar diffraction efficiencies result.

Thus, grating structures 14 produce an optically diffusing effect on the beams of rays falling on them. As a result, possible soiling on measuring standard 10 is not imaged sharply into the detection plane, and thus only minimally impairs the generation of the reference signal. Moreover, the indicated dimensioning of grating structures 14 ensures that the signals resulting from the incremental track and the reference track influence each other only slightly.

As illustrated in FIGS. 1 and 2, reference marking 11 at reference position $X_{REF}$ includes two reference-marking subfields $11_A$, $11_B$ disposed in mirror symmetry relative to a reference-marking axis of symmetry RS. Each of the two reference-marking subfields $11_A$, $11_B$ includes a structure or grating-ruling structure extending in measuring direction x and having locally changing graduation periods. In the example shown, in each case the structures adjacent to reference-marking axis of symmetry RS have the smallest graduation periods. Graduation periods which become continuously larger in each instance are provided going outwardly in measuring direction x. Consequently, the structures in the two reference-marking subfields $11_A$, $11_B$ of reference marking 11 are in the form of what are referred to as chirped graduation structures, a chirp pattern in mirror symmetry relative to reference-marking axis of symmetry RS being provided in the two reference-marking subfields $11_A$, $11_B$. In addition, reference is made to German Published Patent Application No. 10 2008 044 858, mentioned above, which is expressly incorporated herein in its entirety by reference thereto, with regard to the detailed formation of chirped reference-marking subfields $11_A$, $11_B$. In German Published Patent Application No. 10 2008 044 858, according to equations 1.1, 1.2, the chirp pattern in reference marking 11 is described via graduation frequency $f_{MS}(x)$ on the measuring standard side. In the present exemplary embodiment, $f_0$=7.2 1/mm and L=1.25 mm are selected as characteristic quantities in equations 1.1 and 1.2, where $f_0$ indicates the average graduation frequency on the measuring-standard side and L indicates the length of the structure in a reference-marking subfield $11_A$, $11_B$ in measuring direction x.

In order to generate the displacement-dependent output signals in the form of the periodic incremental signals and of the at least one reference-pulse signal RI at at least one defined reference position $x_{REF}$, a number of components are located in scanning unit 20 which, for the sake of simplicity, are denoted in summary as a scanning device. In the present example, the scanning device needed for generating reference-pulse signal RI include a light source 21 emitting divergently in the direction of measuring standard 10, one or more gratings, as well as a specially designed reference-signal detector system 22 adapted to reference marking 11. In the exemplary embodiment having a scanning beam path for generating the reference-signal according to FIG. 1, a diaphragm having a transmitting slit 23 is provided as a grating in scanning unit 20 and is placed between light source 21 and measuring standard 10.

Reference-signal detector system 22, which is illustrated in a top view in FIG. 3a, includes at least four detector arrays 22.1 to 22.4. They each include a plurality of rectangular, optoelectronic detector elements 22a to 22e in the form of photodiodes which are positioned extending in measuring direction x. The rectangle longitudinal axis of detector elements 22a to 22e is oriented in the indicated y-direction, i.e., perpendicular to measuring direction x in the detection plane.

As illustrated in FIG. 3a, a first detector array 22.1 and a second detector array 22.4 of reference-signal detector system 22 are formed in mirror symmetry relative to a first detector axis of symmetry DS1 that extends in the detection plane in a direction perpendicular to measuring direction x. First detector array 22.1 and second detector array 22.4 are disposed offset relative to each other in the detection plane perpendicular to measuring direction x, i.e., in the indicated y-direction. As illustrated in the enlarged representation of the central area of detector system 22 in FIG. 3b, with the exception of the detector elements through which first detector axis of symmetry DS1 extends, all detector elements 22a, 22b, 22e of second detector array 22.4 are offset in the y-direction relative to first detector array 22.1 in this exemplary embodiment.

As illustrated in FIG. 3a, a third detector array 22.3 and a fourth detector array 22.2 of reference-signal detector system 22 are formed and positioned in analogous fashion. That is, fourth detector array 22.2 is formed in mirror symmetry with respect to third detector array 22.3 relative to a second detector axis of symmetry DS2, which likewise extends in the detection plane perpendicular to measuring direction x, however, offset by the amount ΔDS in the measuring direction relative to first detector axis of symmetry DS1. Third detector array 22.3 and fourth detector array 22.2 are again disposed offset relative to each other in the detection plane perpendicular to measuring direction x, i.e., in the indicated y-direction. As illustrated in the enlarged representation of the central area of detector system 22 in FIG. 3b, in this exemplary embodiment, with the exception of the detector elements through which second detector axis of symmetry DS2 extends, all detector elements 22c, 22d, 22e of fourth detector array 22.2 are offset in the y-direction relative to third detector array 22.3.

Thus, in this example embodiment, a crosswise configuration of specularly symmetrical first and second detector arrays 22.1, 22.4, and third and fourth detector arrays 22.3, 22.2, respectively, results in reference-signal detector system 22. This is considered advantageous particularly in the case of inhomogeneous intensity distributions in the detection plane as exist, for example, when scanning with divergent lighting.

As illustrated in FIG. 3a, detector elements 22a, 22b, 22e of first and second detector arrays 22.1, 22.4 are arranged along measuring direction x such that, starting from first detector axis of symmetry DS1, in measuring direction x, the center-to-center distances between adjacent detector elements 22a, 22b, 22e in the same direction change in the manner of the graduation periods of the structures in the two reference-marking subfields $11_A$, $11_B$, starting from reference-marking axis of symmetry RS. Consequently, just like reference marking 11, first and second detector arrays 22.1, 22.4 of reference-signal detector system 22 have a symmetrically chirped structure with respect to the arrangement of corresponding detector elements 22a, 22b, 22e.

The formation of third and fourth detector arrays 22.3, 22.2 in reference-signal detector system 22 is also provided in analogous fashion, a symmetrically chirped structure or configuration of detector elements 22c, 22d 22e relative to second detector axis of symmetry DS2 being present. As mentioned above, second detector axis of symmetry DS2 is offset in the measuring direction by the amount ΔDS relative to first detector axis of symmetry DS1.

In first and second detector arrays 22.1, 22.4 and in third and fourth detector arrays 22.3, 22.2, respectively, in each case, the symmetrically chirped arrangement of detector elements 22a to 22e is implemented in a manner adapted to the symmetrically chirped formation of reference marking 11 on measuring standard 10. This means that the distances between adjacent detector elements 22a to 22e in detector arrays 22.1 to 22.4 changes analogously to the spacings of the graduation structures in reference-marking subfields $11_A$, $11_B$. With regard to the specific arrangement of individual detector elements 22a to 22d for acquiring the phase-shifted partial reference signals in the two pairs of detector arrays, reference is again made to German Published Patent Application No. 10 2008 044 858, particularly equations 2.1 and 2.2. For the present formation of detector arrays 22.1 to 22.4, $f_0$=7.2 1/mm, L=1.25 mm and k=1 are selected as characteristic quantities in equations 2.1 and 2.2, where $f_0$ indicates the average graduation frequency on the measuring-standard side, L indicates the length of the structure in a reference-marking subfield $11_A$, $11_B$ in measuring direction x, and k indicates the type of optical scanning (k=1: signal acquisition via $+/-1^{st}$ orders of diffraction; k=2: signal acquisition via $0^{th}$, $+/-1^{st}$ orders of diffraction).

From detector elements 22a to 22d illustrated identically in FIG. 3a, in each case identical partial reference signals result from the scanning of the reference track, which are then subsequently further processed to produce a reference signal RI. Thus, detector elements 22a from first and second detector arrays 22.1, 22.4 supply a partial reference signal which hereinafter is denoted by reference symbol S1_T. Detector elements 22b from first and second detector arrays 22.1, 22.4 supply partial reference signal S1_GT. Detector elements 22c from third and fourth detector arrays 22.3, 22.2 supply partial reference signal S2_T, and detector elements 22d from third and fourth detector arrays 22.3, 22.2 supply partial reference signal S2_GT. Thus, by the reference-signal detector system, a total of four partial reference signals S1_T, S1_GT, S2_T, S2_GT are generated, which are then further processed to form one ultimately resulting reference signal RI.

In the present exemplary embodiment, in each case, steady-radiation detector elements 22e are provided between the various detector elements 22a to 22d of detector arrays 22.1 to 22.4, which supply the various partial reference signals S1_T, S1_GT and S2_T, S2_GT, respectively, in reference-signal detector system 22. A signal is generated via steady-radiation detector elements 22e, from which an adjustment signal is obtained which is modulated as little as possible, and which is used within the context of the further signal processing for producing reference signal RI. Reference is made to the further course of the description for the specific signal processing.

In the exemplary embodiment of reference-signal detector system 22 shown, detector elements 22a to 22d, from which partial reference signals S1_T, S1_GT, S2_T, S2_GT are generated, each have a width in measuring direction x which corresponds to approximately one third the local graduation period of respective detector array 22.1 to 22.4. As illustrated in FIG. 3, in each case, two steady-radiation detector elements 22e are provided per local graduation period of detector arrays 22.1 to 22.4, and each has a width in measuring direction x which corresponds to approximately one sixth the local graduation period of respective detector array 22.1 to 22.4.

Figure 4A:
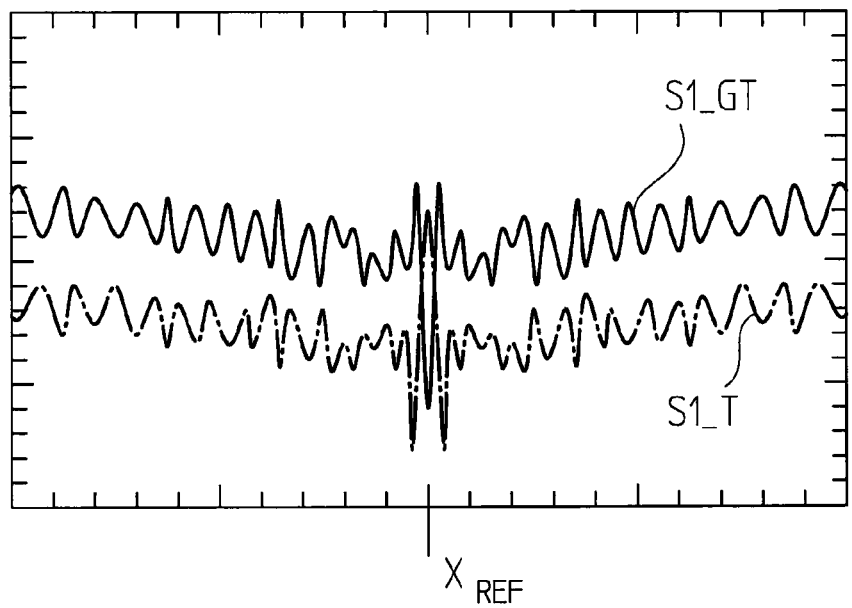
FIGS. 4 and 4b show pairs of partial reference signals in the area of the reference position, which are generated via the reference-signal detector system illustrated in FIG. 3.
Figure 4B:
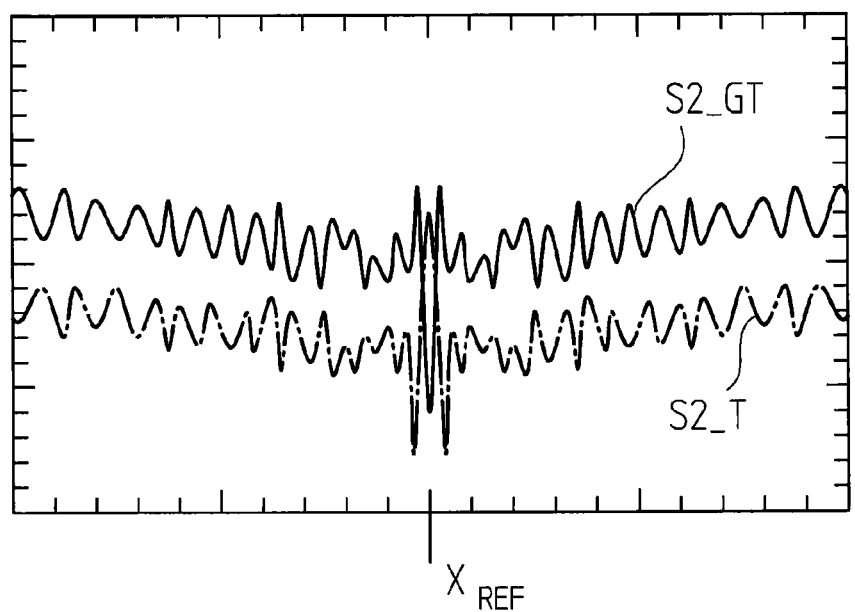

Such a formation of reference-signal detector system 22 thus ensures that a first pair of partial reference signals S1_T, S1_GT as well as a second pair of partial reference signals S2_T, S2_GT result from the scanning of reference marking 11 via reference-signal detector system 22. The first pair of partial reference signals S1_T, S1_GT is offset by an offset amount along measuring direction x relative to the second pair of partial reference signals S2_T, S2_GT. Typically, the offset amount between the first and second pairs of partial reference signals S1_T, S1_GT, S2_T, S2_GT amounts to several signal periods of the incremental signal which results from the scanning of incremental track 12. The signal patterns of partial reference signals S1_T, S1_GT or S2_T, S2_GT of a pair are in each case in phase opposition or inverse relative to each other. This means that in the case of a signal maximum of partial reference signal S1_T or S2_T in the first or second pair in the area of reference position $x_{REF}$, associated partial reference signal S1_GT or S2_GT then has a signal minimum there or vice versa. The pattern of the four different partial reference signals S1_T, S1_GT, S2_T, S2_GT produced in this manner is shown in FIGS. 4a and 4b in the area of reference position $x_{REF}$.

As already mentioned above, because of offset ΔDS provided between axes of symmetry DS1, DS2 of the first and second pair of detector arrays 22.1, 22.4 and 22.3, 22.2, respectively, partial reference signals S1_T, S1_GT have an offset amount ΔDS/2 in measuring direction x relative to partial reference signals S2_T, S2_GT, which results from the optical scanning principle utilized.

The further processing of partial reference signals S1_T, S1_GT, S2_T, S2_GT thus produced to form one high-resolution reference signal RI resulting on the output side is explained in the following for the present exemplary embodiment with reference to FIGS. 9 and 5a to 8; in this context, FIG. 9 shows a suitable circuit configuration for the signal processing, and FIGS. 5a to 8 show various signals resulting in the course of the signal processing.

Figure 5A:
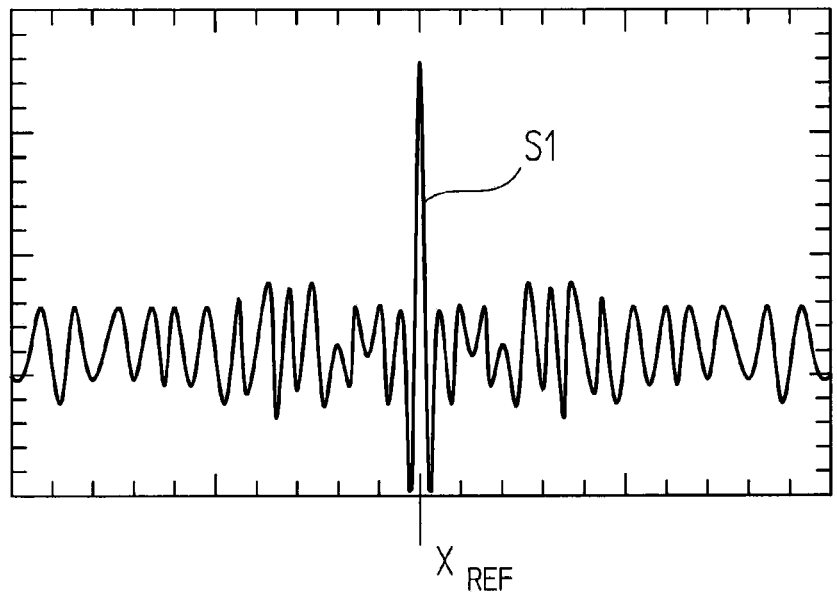
FIGS. 5a and 5b show the signals derived from the pairs of partial reference signals.
Figure 5B:
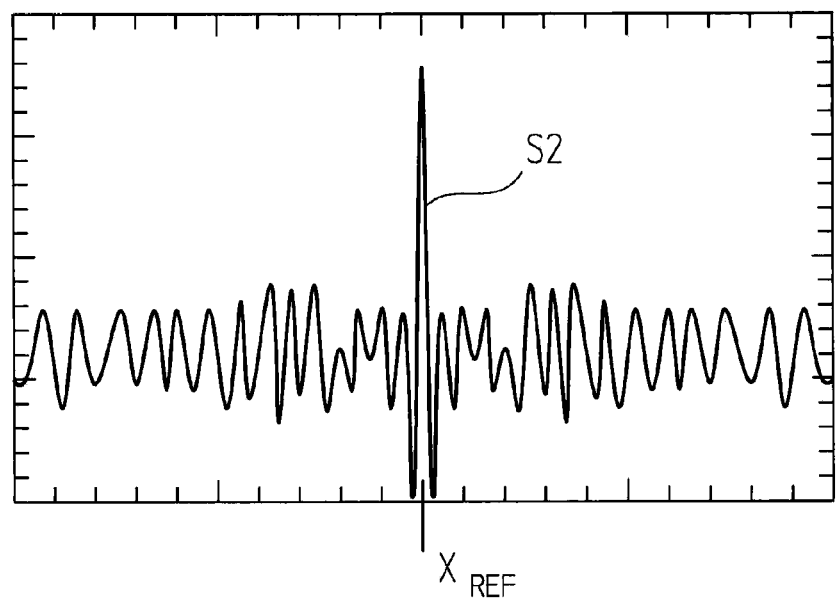

As illustrated in FIG. 9, partial reference signals S1_T, S1_GT, S2_T, S2_GT generated via detector elements 22a to 22d are supplied in pairs to two differential amplifiers 30.1, 30.2. In so doing, in each case, partial reference signals S1_T, S1_GT and S2_T, S2_GT, respectively, in phase opposition, are fed to the corresponding inputs of the two differential amplifiers 30.1, 30.2. In each instance, a pulse-shaped signal S1, S2 results at the output of the two differential amplifiers 30.1, 30.2; the pattern of pulse-shaped signals S1, S2 in the area of reference position $x_{REF}$ is illustrated in FIGS. 5a and 5b.

Figure 6A:
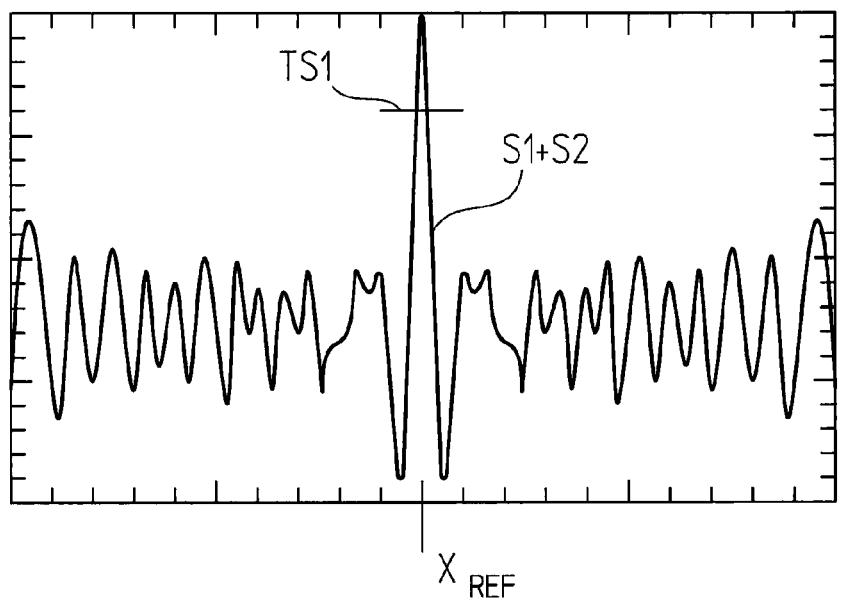
FIGS. 6a and 6b show the composite signal and differential signal derived from the signals illustrated in FIGS. 5a and 5b.
Figure 6B:
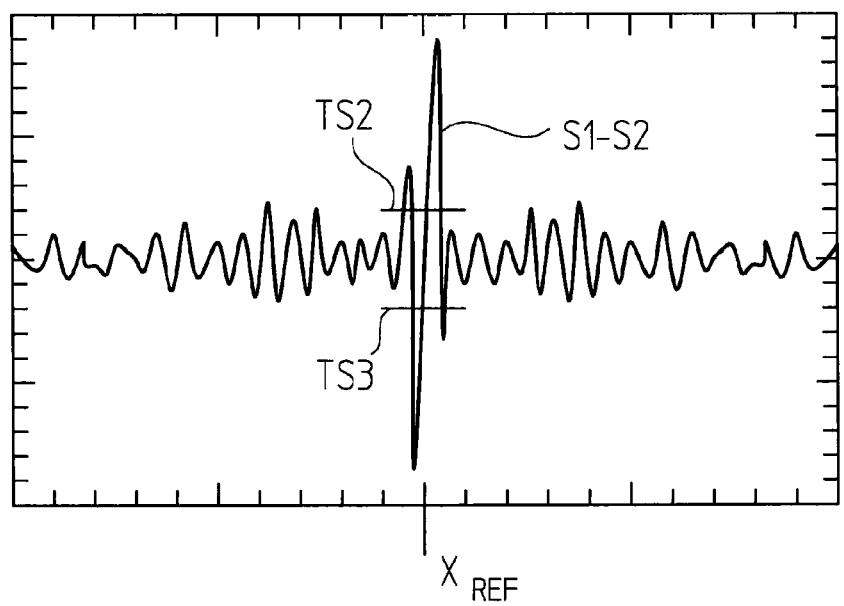
Figure 7:
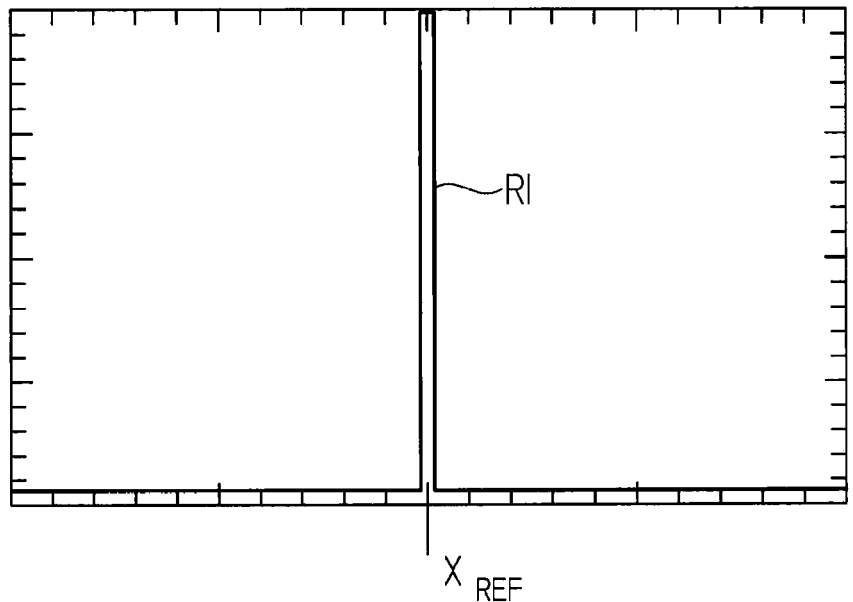
FIG. 7 illustrates the reference signal derived from the composite signal and differential signal illustrated in FIGS. 5a and 5b.

A composite signal S1+S2 and a differential signal S1−S2 are formed from pulse-shaped signals S1, S2 by summation element 31 and subtraction element 32 downstream of the two differential amplifiers 30.1, 30.2. Composite signal S1+S2 is shown in the area of reference position $x_{REF}$ in FIG. 6a, and differential signal S1−S2 is shown in FIG. 6b.

Composite signal S1+S2 is supplied to a first input of a first comparator 33.1. Differential signal S1−S2 is supplied to the respective first inputs of a second and third comparator 33.2, 33.3. Trigger signals TS1, TS3, TS2, that are derived from the adjustment signal which is obtained via steady-radiation detector elements 22e, are applied to the respective second inputs of the various comparators 33.1, 33.2, 33.3. The signal generated via steady-radiation detector elements 22e is first of all amplified by an amplifier element 34 to form an adjustment signal $S_A$. FIG. 8 shows the substantially unmodulated pattern of adjustment signal $S_A$ in the area of reference position $x_{REF}$. Adjustment signal $S_A$ is amplified by three further amplifier elements 34.1, 34.2, 34.3 having different amplification factors a, c, b to form the three trigger signals TS1=a·$S_A$, TS2=b·$S_A$, TS3=c·$S_A$, which are applied to the respective second inputs of the three comparators 33.1, 33.3, 33.2. Downstream of comparators 33.1, 33.2, 33.3 is a logic element 35 in the form of an AND logic element. Given a suitable setting of the various trigger signals TS1, TS2, TS3, at the output of logic element 35, reference signal RI, shown in FIG. 7, results at the location of reference position $x_{REF}$.

Reference signal RI is output via AND logic element 35 when all three of the following conditions i), ii), iii) are satisfied:

$$S1+S2 > TS1 \qquad \text{i)}$$

$$S1-S2 > TS3 \qquad \text{ii)}$$

$$S1-S2 < TS2 \qquad \text{iii)}$$

Therefore, by the defined setting of trigger signals TS2, TS3, that is, by the selection of amplification factors b, c of amplifier elements 34.3, 34.2, the position and width of reference signal RI are able to be set in defined fashion electronically in the optical position-measuring device.

Preferably, trigger signal TS1 is selected so that it lies close to zero, however, has a positive value. In FIG. 6a, a corresponding trigger signal TS1 is illustrated in conjunction with composite signal S1+S2. In this manner, it may be ensured that no reference signal RI is generated inadvertently, even when the light source is switched off.

Figure 10:
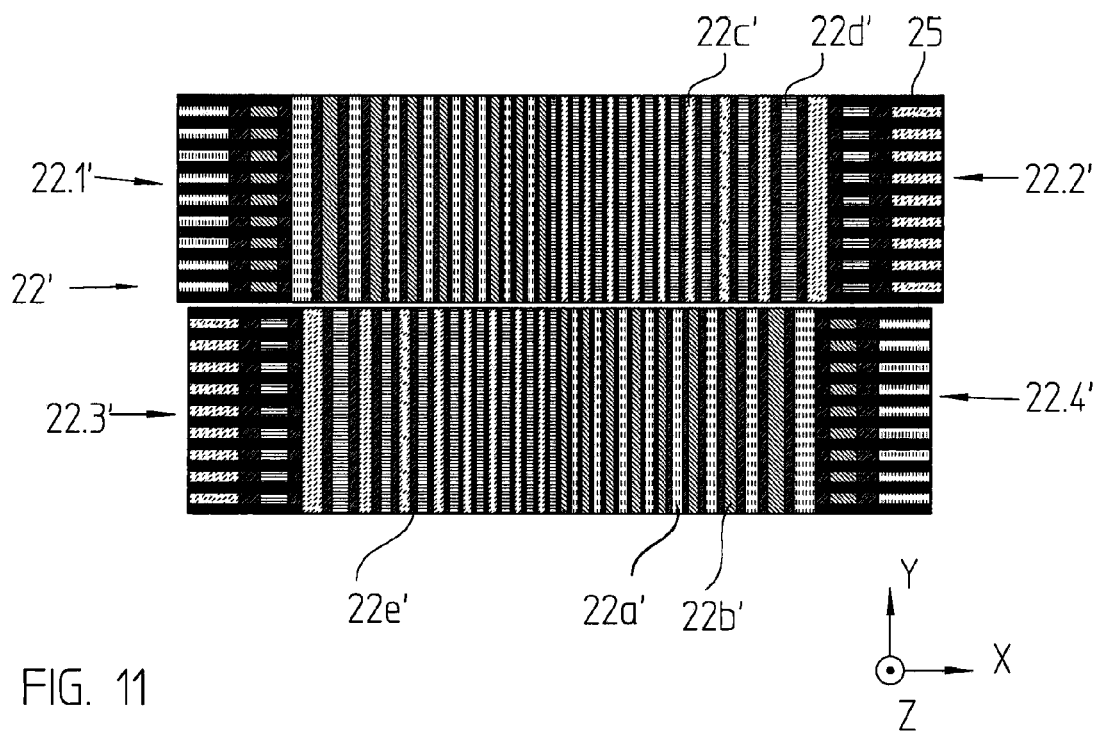

A slightly modified variant of reference-signal detector system 22' of the first exemplary embodiment of the optical position-measuring device is schematically illustrated in FIG. 10. The placement and form of the various detector arrays 22.1' to 22.4' as well as the placement of detector elements 22a' to 22e' correspond to those illustrated in FIG. 3a. In addition, however, disposed on a portion of detector elements 22a' to 22e' are cover gratings 25 whose grating lines are oriented in the x-direction, i.e., orthogonally relative to the longitudinal-extension direction of detector elements 22a' to 22e'. In this context, only detector elements 22a' to 22e' of reference-signal detector system 22' which are situated on the outside in relation to the axes of symmetry are provided with such cover gratings 25. The degree to which the light-sensitive surfaces of detector elements 22a' to 22e' are covered amounts to approximately 50%. In this manner, the weighting of detector elements 22a' to 22e' located on the outside in detector arrays 22.1' to 22.4' is reduced in the signal generation. For instance, this is considered to be advantageous in the event there is soiling in the area of the reference marking on the measuring standard, since in this case, the signal portions of outer detector elements 22a' to 22e' fall away asymmetrically, and would impair the signal processing.

For example, cover gratings 25 may be disposed on a scanning plate, which is placed above reference-signal detector system 22' in the scanning unit. In addition, it would be possible to apply cover gratings 25 as a metallic patterning directly on reference-signal detector system 22' in the corresponding areas. Moreover, it could also be provided to pattern detector elements 22a' to 22e' in these areas in the longitudinal direction, to thus likewise attain the optical effect of a cover grating 25.

Figure 11:
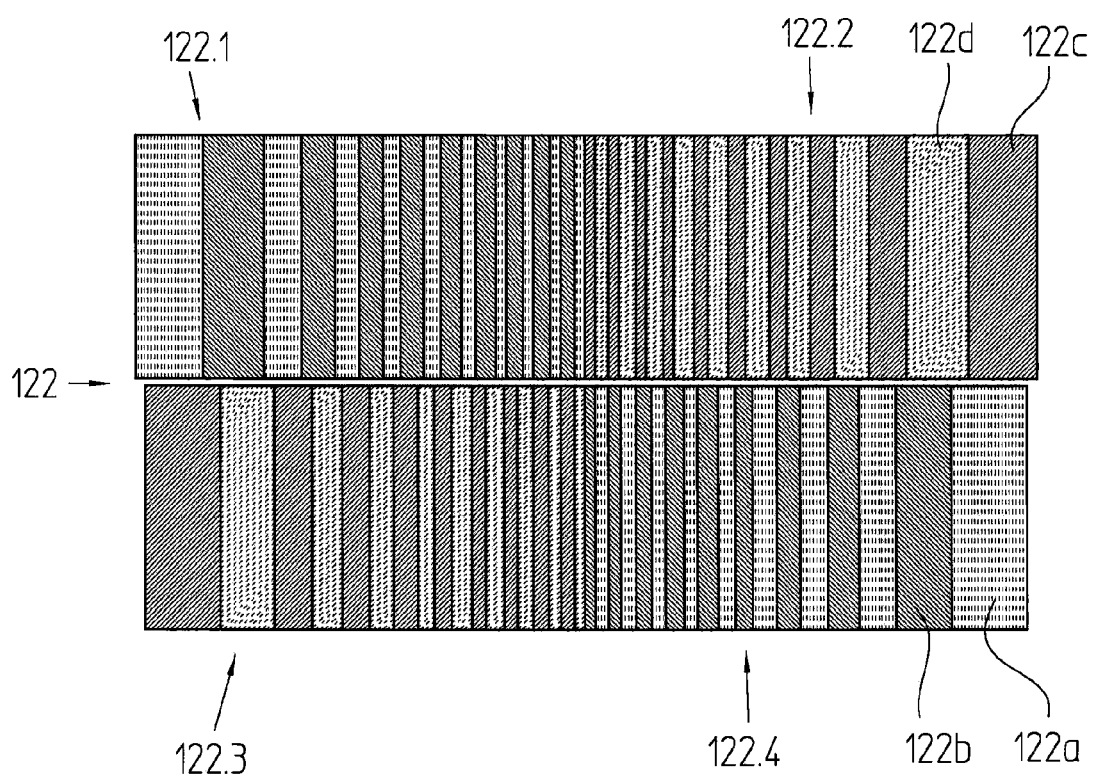
FIG. 11 is a schematic partial view of the detection plane of the optical position-measuring device, having a second exemplary embodiment of a suitable reference-signal detector system.

A second example embodiment of the optical position-measuring device is explained with reference to FIGS. 11 and 12. FIG. 11 shows a view of the reference-signal detector system, and FIG. 12 shows the circuit configuration for generating reference signal RI.

In the following, only significant differences compared to the first exemplary embodiment are described. These differences relate generally to the manner of generating the adjustment signal. While in the first exemplary embodiment, separate steady-radiation detector elements are provided in the various detector arrays for generating the adjustment signal, in the present example, the adjustment signal is obtained from a summation of all partial reference signals of the detector elements from the detector arrays.

For the reference-signal detector system shown in FIG. 11, this means that no separate steady-radiation detector elements are provided in the four detector arrays 122.1 to 122.4, but only those detector elements 122a to 122d which generate partial reference signals S1_T, S1_GT, S2_T, S2_GT. As a result of the absence of the steady-radiation detector elements, detector elements 122a to 122d, from which partial reference signals S1_T, S1_GT, S2_T, S2_GT are generated, each have a width in measuring direction x which corresponds to half the local graduation period of respective detector array 122.1 to 122.4.

Figure 12:
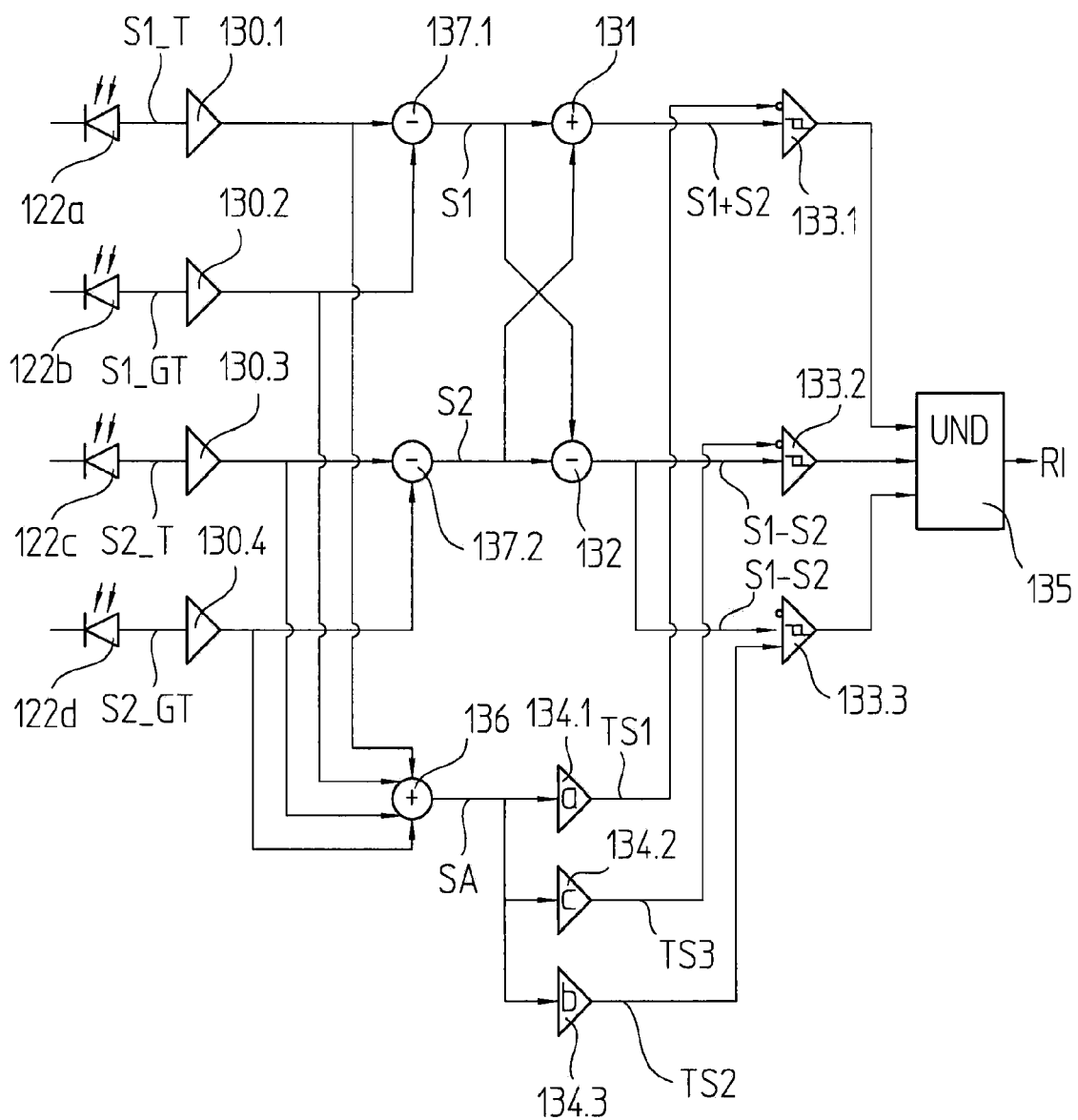
FIG. 12 illustrates a circuit configuration for processing the partial reference signals from the reference-signal detector system illustrated in FIG. 11.

For generating adjustment signal $S_A$, in the circuit configuration according to FIG. 12, a summation element 136 is provided to which the four partial reference signals S1_T, S1_GT, S2_T, S2_GT are supplied, in order to be summed up to form adjustment signal $S_A$. The further processing of adjustment signal $S_A$ via amplifier elements 134.1 to 134.3 and the feeding of the differently amplified signals as trigger signals TS1 to TS3 to the respective second inputs of three comparators 133.1 to 133.3 are carried out analogously to the first exemplary embodiment.

The four partial reference signals S1_T, S1_GT, S2_T, S2_GT, generated via detector elements 122a to 122d, are amplified by amplifier elements 130.1 to 130.4 and, as shown, are subsequently interconnected in difference by pairs via subtraction elements 137.1, 137.2. Resulting at the output of the two subtraction elements 137.1, 137.2 are pulse-shaped signals S1, S2 which are likewise further processed again analogously to the first exemplary embodiment, via summation element 131 and subtraction element 132 before, as shown, composite signal and differential signal S1+S2, S1−S2 are applied to the first inputs of the three comparators 133.1 to 133.3. Reference signal RI results in turn at the output of logic element 135.

In addition to the exemplary embodiments described herein, other arrangements are possible. For example, as an alternative, trigger signals TS1 to TS3 could also be generated completely statically from suitable voltage sources. It is also possible to generate only trigger signal TS1 from the adjustment signal, as described above, and the two other trigger signals TS2, TS3 statically from suitable voltage sources.

Moreover, in place of the crosswise configuration of the four detector arrays described above, it is possible to select an alternative configuration in the reference-signal detector system. In so doing, a first and a second detector array could again be formed in mirror symmetry relative to a first detector axis of symmetry which extends in the detection plane perpendicular to the measuring direction. However, in contrast to the exemplary embodiment described above, the first and the second detector array would be disposed adjacent to each other in the measuring direction, and not offset in the y-direction. Furthermore, a third and a fourth detector array would be formed in mirror symmetry relative to a second detector axis of symmetry which extends in the detection plane perpendicular to the measuring direction and is offset in the measuring direction relative to the first detector axis of symmetry. Also, in contrast to the exemplary embodiment previously described, the third and fourth detector arrays are disposed adjacent to each other in the measuring direction, e.g., likewise not offset in the y-direction. In this variant, the first and second detector arrays would be offset in the extension direction of the detector axes of symmetry relative to the third and fourth detector arrays.

What is claimed is:

1. An optical position-measuring device for detecting a position of two objects movable relative to each other in at least one measuring direction, comprising:
    a measuring standard joined to one of the two objects and including an incremental graduation extending in the measuring direction and at least one reference marking at a reference position, the reference marking including two reference-marking subfields arranged in mirror symmetry relative to a reference-marking axis of symmetry, each reference-marking subfield including a grating structure that extends in the measuring direction and has a locally changeable graduation period; and
    a scanning unit joined to the other one of the two objects and including a divergently emitting light source, at least one grating, and a reference-signal detector system;
    wherein the reference-signal detector system includes at least four detector arrays, each detector array including a plurality of detector elements; and
    wherein the detector arrays are adapted to form, from scanning of the reference marking via the reference-signal detector system, a first pair of partial reference signals and a second pair of partial reference signals, each having a signal pattern in phase opposition, the first pair of partial reference signals offset along the measuring direction by an offset amount relative to the second pair of partial reference signals.

2. The optical position-measuring device according to claim 1, wherein the detector elements a first detector array and a second detector array are configured such that, starting from a first detector axis of symmetry, in the measuring direction, center-to-center distance between adjacent detector elements in the same direction change in accordance with graduation periods of the grating structures in the reference-marking subfields, starting from the reference-marking axis of symmetry, and the detector elements of a third detector array and a fourth detector array are configured such that, starting from a second detector axis of symmetry, in the measuring direction, center-to-center distances between adjacent detector elements in the same direction change in accordance with the graduation periods of the grating structures in the reference-marking subfields, starting from the reference-marking axis of symmetry.

3. The optical position-measuring device according to claim 2, wherein the second detector axis of symmetry is offset relative to the first detector axis of symmetry by an amount that corresponds to double the offset amount between the first pair of partial reference signal and the second pair of partial reference signals.

4. The optical position-measuring device according to claim 1, further comprising an adjustment signal generation device adapted to generate an adjustment signal that results from optical scanning of the reference marking on the measuring standard, the adjustment signal adapted to set at least one trigger signal for further processing of the partial reference signals to form one reference signal.

5. The optical position-measuring device according to claim 4, wherein the adjustment signal generation device includes steady-radiation detector elements arranged between the detector elements of the detector arrays.

6. The optical position-measuring device according to claim 4, wherein the adjustment signal generation device includes a summation element adapted to sum up all partial reference signals of the detector arrays.

7. The optical position-measuring device according to claim 4, further comprising:
- two differential amplifiers, the first pair of partial reference signals and the second pair of partial reference signals being applied to inputs of the differential amplifiers, the differential amplifiers adapted to output pulse-shaped signals for further processing;
- arranged downstream of the two differential amplifiers, a summation element adapted to output a composite signal from the pulse-shaped signals and a subtraction element adapted to output a differential signal from the pulse-shaped signals;
- a plurality of comparators, a first input of at least one first comparator adapted to receive the composite signal and a first input of at least one second comparator adapted to receive the differential signal, a second input of each comparator adapted to receive a respective trigger signal derived from the adjustment signal; and
- arranged downstream of the comparators, a logic device adapted to output the reference signal.

8. The optical position-measuring device according to claim 7, wherein the adjustment signal generation device includes steady-radiation detector elements arranged between the detector elements of the detector arrays, the optical position-measuring device further comprising an input amplifier adapted to amplify the adjustment signal and to supply the amplified adjustment signal to three amplifiers having different adjustable amplification factors and adapted to supply the three differently amplified signals derived from the adjustment signal as trigger signals to the second inputs of the comparators.

9. The optical position-measuring device according to claim 7, wherein the adjustment signal generation device includes a summation element adapted to sum up all partial reference signals of the detector arrays and to supply the adjustment signal to three amplifiers having different adjustable amplification factors, the three amplifiers adapted to supply the three differently amplified signals derived from the adjustment signal as trigger signals to the second inputs of the comparators.

10. The optical position-measuring device according to claim 1, further comprising a diaphragm having a transmission slit arranged between the light source and the measuring standard.

11. The optical position-measuring device according to claim 1, further comprising cover gratings arranged over a portion of the detector elements and having grating lines oriented orthogonally relative to a longitudinal-extension direction of the detector elements.

12. The optical position-measuring device according to claim 1, further comprising grating structures arranged in the measuring direction on both sides adjacent to the reference marking in a reference track on the measuring standard and adapted to produce an optically diffusion effect on incident beams of rays.

13. The optical position-measuring device according to claim 12, wherein the grating structures in the reference track have a graduation period that corresponds to half a graduation period of the incremental graduation arranged in an incremental track on the measuring standard.

14. The optical position-measuring device according to claim 12, wherein the grating structures in the reference track have a line/graduation-period ratio of 0.25.

15. The optical position-measuring device according to claim 1, wherein the detector system includes four detector arrays, a first detector array and a second detector array being arranged in mirror symmetry relative to a first detector axis of symmetry that extends in a detection plane perpendicular to the measuring direction, the first detector array and the second detector array offset relative to each other in the detection plane perpendicular to the measuring direction, a third detector array and a fourth detector array being arranged in mirror symmetry relative to a second detector axis of symmetry that extends in the detection plane perpendicular to the measuring direction and is offset in the measuring direction relative to the first detector axis of symmetry, the third detector array and the fourth detector array being offset relative to each other in the detection plane perpendicular to the measuring direction.

16. The optical position-measuring device according to claim 1, wherein the detector system includes four detector arrays, a first detector array and a second detector array being arranged in mirror symmetry relative to a first detector axis of symmetry that extends in a detection plane perpendicular to the measuring direction, the first detector array and the second detector array being arranged adjacent to each other in the measuring direction, a third detector array and a fourth detector array being arranged in mirror symmetry relative to a second detector axis of symmetry that extends in the detection plane perpendicular to the measuring direction and is offset in the measuring direction relative to the first detector axis of symmetry, the third detector array and fourth detector array being arranged adjacent to each other in the measuring direction, the first detector array and second detector array being offset in an extension direction of the detector axes of symmetry relative to the third detector array and the fourth detector array.

17. An optical position-measuring device for detecting a position of two objects movable relative to each other in at least one measuring direction, comprising:
- a measuring standard joined to one of the two objects and including an incremental graduation extending in the measuring direction and at least one reference marking at a reference position, the reference marking including two reference-marking subfields arranged in mirror symmetry relative to a reference-marking axis of symmetry, each reference-marking subfield including a chirped grating structure that extends in the measuring direction; and
- a scanning unit joined to the other one of the two objects and including a divergently emitting light source, at least one grating, and a reference-signal detector system;
- wherein the reference-signal detector system includes at least four detector arrays, each detector array including a plurality of detector elements; and
- wherein the detector arrays are adapted to form, from scanning of the reference marking via the reference-signal detector system, a first pair of partial reference signals and a second pair of partial reference signals, each having a signal pattern in phase opposition, the first pair of partial reference signals offset along the measuring direction by an offset amount relative to the second pair of partial reference signals.

* * * * *